United States Patent Office 3,467,315
Patented Sept. 16, 1969

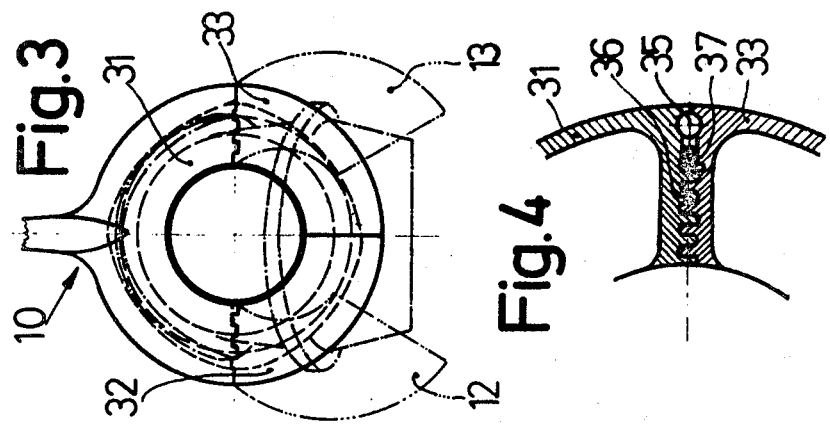
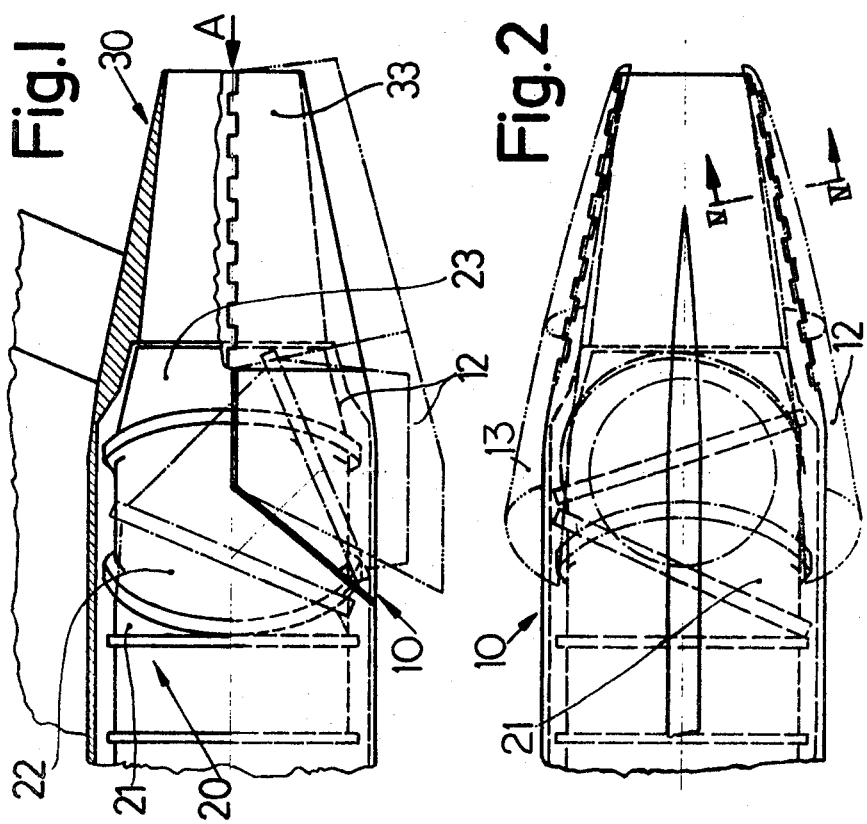

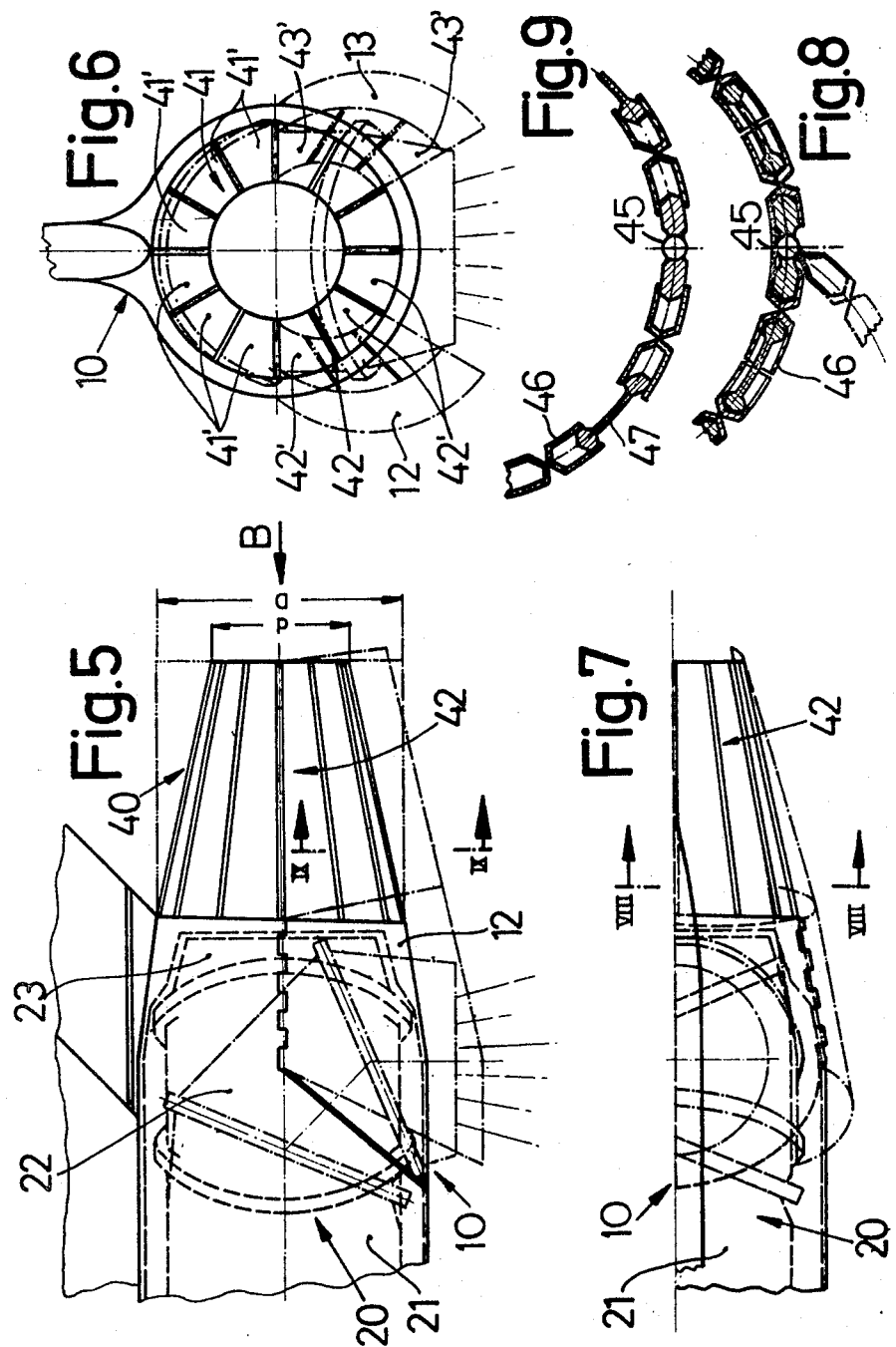

3,467,315
AIRFRAME-INTEGRATED NOZZLE FOR AIRCRAFT
Gunter Broll and Gerhard Kopp, Munich, Germany, assignors to Entwicklungsring Sud GmbH, a corporation of Germany
Filed June 20, 1967, Ser. No. 647,461
Claims priority, application Germany, July 15, 1966,
E 32,074
Int. Cl. B64c *15/08;* F02k *1/20*
U.S. Cl. 239—265.35                4 Claims

ABSTRACT OF THE DISCLOSURE

This invention provides a hinged bottom portion for a wall or shroud disposed about a deflecting nozzle whereby when said nozzle is deflected downwardly the hinged bottom is movable away from the jet stream. The structure further includes similar structure so that an end nozzle has a hinged portion for the same reason.

---

The invention refers to the special configuration of nozzles for aircraft. It is known, that jet aircraft are specially suited for high speeds. In this connection, airframe-integrated nozzles are also utilized to provide forward propelling forces.

However, due to the high wing loading jet aircraft, high landing speeds are required. In addition, take-off distance increases with the wing loading of an aircraft. The efforts to reduce the landing speed to a minimum result in the requirement that the loss of wing lift forces at lower landing speeds be compensated by rotating the nozzle so as to transform the thrust produced by the nozzles into vertical forces. In this manner, high speed aircraft can land at relatively low speeds in spite of the small wing surface area.

Now, if in airframe-integrated forward propelling nozzles, the hot exhaust gases are deflected toward the ground by means of a suitable deflection arrangement in order to alleviate the starting cycle or to reduce the take-off distance, the hot engine exhaust gases flow over a section of the nozzle. The results of this are, in addition to random jet efflux refractions or components of the jet efflux force, an appreciable loss of thrust and an increase in high thermal loads on the components of the airframe-integrated forward propelling nozzle.

In order to eliminate these disadvantages, this invention provides an airframe-integrated nozzle for aircraft where parts of the nozzle are simultaneously deflected downwardly and outwardly during the translational conditions of short take-off or landing, the jet efflux deflection results in the maximum efficiency of the thrust forces, while at the same time aircraft components are prevented from the deteriorating effects of the heat.

These and other objects of the invention will become more apparent to those skilled in the art by reference to the following detailed description when viewed in light of the accompanying drawings, wherein:

FIGURE 1 is a partial longitudinal cross section of an aircraft tail assembly where the application of the device being the subject of the invention, is shown with a non-variable area nozzle;

FIGURE 2 is a top plan of FIGURE 1;

FIGURE 3 is a view in the direction of the arrowhead A in FIGURE 1;

FIGURE 4 is a partial cross section according to line IV—IV in FIGURE 2;

FIGURE 5 is a partial longitudinal cross section through an aircraft tail assembly showing the application of the device being the subject of the invention, with a variable area nozzle;

FIGURE 6 is a view according to direction B of arrowhead in FIGURE 5;

FIGURE 7 is a top plan of FIGURE 5;

FIGURE 8 is a partial cross section according to line VIII—VIII of FIGURE 7 showing the application with the variable-area nozzle adjusted to smallest opening;

FIGURE 9 is a partial cross section according to line IX—IX of FIGURE 5 showing the application with the variable-area nozzle adjusted to the largest opening.

On a tail assembly designated 10 throughout the following discussion, a rotatable nozzle 20 is mounted consisting of segments made up of tubing 21, 22 and 23 which are rotatable relative to one another. This arrangement provides for various positions of the nozzle so that the rotatable nozzle 20 may be placed in the faired condition as shown in FIGURE 1 where the engine exhaust gases may escape without deflection straight to the rear and out through the end nozzle 30 or in the position indicated by a dash and dot line where the engine exhaust gases are deflected 90°.

Without the use of the instant invention, the non-variable area nozzle 30 according to FIGURES 1 through 4 or the variable area nozzle 40 according to FIGURES 5 through 9, will hinder the free flow of the engine exhaust gases when the nozzle 20 is rotated. In addition, random jet refractions or force components of the engine jet will cause loss of lift and subject the components of the airframe-integrated forward propelling nozzles 30 or 40 to considerable thermal loads.

In order to eliminate these effects, the airframe-integrated forward propelling nozzles 30 and 40 are of a split configuration so that the components 32, 33 or 42, 43 may be folded downward and to the sides by means of hinges 35 and 45. An especially favorable configuration provides for simultaneous folding of sections of the nozzle walls 32 and 33 or 42 and 43 together with the folding of fuselage-integrated wall sections 12 and 13 which otherwise would have to be removed in order to permit the jet exhaust to escape when the nozzle is rotated 90°.

Wedge type grooves 36 and/or sealing strips 37 may be applied to the joints to provide positive sealing of the hinges 35.

In the embodiment according to FIGURES 5 through 9, the nozzle 40 features variable area, providing diameter $d$ in the fully closed position and diameter $D$ in the full open position. Therefore, the rigid portion of the nozzle 41 consists of individual strips 41', while the flexible portions 42 and 43 feature the strips 42' and 43'. Sliding seal strips 47 installed in the hollow walls 46 of the strips 41', 42', 43' ensure sealing as the nozzle is moved from the small diameter $d$ to the large diameter $D$.

We claim:
1. A jet engine nozzle assembly for an airframe comprising a fuselage engine housing, an end nozzle in said housing,
   a deflectable segmented rotary nozzle inside of said end nozzle, said nozzles and housing being normally in horizontal axial alignment for normal exhaust flow,
   means for deflecting said segmented nozzle downwardly,
   a first hinged wall portion in said engine housing, a second hinged wall portion in said end nozzle, said first and second wall portions normally surrounding said segmented nozzle in concentric relationship when said nozzles and housing are axially aligned and said first and second wall portions being movable from said surrounding relationship thereby forming openings in said end nozzle and housing when said segmented nozzle is deflected.

2. The jet engine nozzle assembly of claim 1 wherein sealing means are provided for said first and second wall portions when in surrounding relationship with respect to said segmented nozzle.

3. The jet engine nozzle assembly of claim 1 wherein said end nozzle has an outlet opening and is segmented into longitudinal sectors whereby said outlet opening may be varied in size.

4. The assembly of claim 1 wherein said first and second wall portions are hinged about horizontal axes.

References Cited

UNITED STATES PATENTS

| | | | |
|---|---|---|---|
| 3,319,892 | 5/1967 | Zirin | 239—265.35 |
| 3,327,480 | 6/1967 | Gunter | 239—265.35 |

U.S. Cl. X.R.

60—232; 239—265.27, 39; 244—52